United States Patent
Tran et al.

(10) Patent No.: US 11,755,570 B2
(45) Date of Patent: Sep. 12, 2023

(54) MEMORY-BASED NEURAL NETWORK FOR QUESTION ANSWERING

(71) Applicant: ADOBE INC., San Jose, CA (US)

(72) Inventors: Quan Tran, San Jose, CA (US);
Walter Chang, San Jose, CA (US);
Franck Dernoncourt, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 171 days.

(21) Appl. No.: 17/116,640

(22) Filed: Dec. 9, 2020

(65) Prior Publication Data
US 2022/0179848 A1    Jun. 9, 2022

(51) Int. Cl.
G06F 7/00       (2006.01)
G06F 16/242     (2019.01)
G06F 40/40      (2020.01)
H04L 51/02      (2022.01)
G06N 3/08       (2023.01)

(52) U.S. Cl.
CPC ............ *G06F 16/243* (2019.01); *G06F 40/40* (2020.01); *G06N 3/08* (2013.01); *H04L 51/02* (2013.01)

(58) Field of Classification Search
CPC ........ G06F 16/243; G06F 40/40; G06F 40/35; G06F 40/289; G06N 3/08; H04L 51/02
See application file for complete search history.

(56) References Cited

U.S. PATENT DOCUMENTS

| | | | |
|---|---|---|---|
| 9,373,086 B1* | 6/2016 | Allen ................ | G06F 16/24522 |
| 10,692,006 B1* | 6/2020 | Zhang ....................... | G06N 3/08 |
| 2014/0141401 A1* | 5/2014 | Agarwal .................. | G06N 5/02 |
| | | | 434/359 |
| 2019/0251184 A1* | 8/2019 | Shan ......................... | G06F 7/16 |
| 2020/0090035 A1* | 3/2020 | Thathachar ............ | G06N 3/063 |
| 2022/0043972 A1* | 2/2022 | Nishida ................ | G06N 3/0445 |

OTHER PUBLICATIONS

Caruana, et al., "Intelligible Models for HealthCare: Predicting Pneumonia Risk and Hospital 30-day Readmission", pp. 1721-1730.

(Continued)

*Primary Examiner* — Mohammed R Uddin
(74) *Attorney, Agent, or Firm* — F. CHAU & ASSOCIATES, LLC (57) ABSTRACT

The present disclosure provides a memory-based neural network for question answering. Embodiments of the disclosure identify meta-evidence nodes in an embedding space, where the meta-evidence nodes represent salient features of a training set. Each element of the training set may include a questions appended to a ground truth answer. The training set may also include questions with wrong answers that are indicated as such. In some examples, a neural Turing machine (NTM) reads a dataset and summarizes the dataset into a few meta-evidence nodes. A subsequent question may be appended to multiple candidate answers to form an input phrase, which may also be embedded in the embedding space. Then, corresponding weights may be identified for each of the meta-evidence nodes. The embedded input phrase and the weighted meta-evidence nodes may be used to identify the most appropriate answer.

19 Claims, 7 Drawing Sheets

(56) References Cited

OTHER PUBLICATIONS

Devlin, et al., "BERT: Pre-training of Deep Bidirectional Transformers for Language Understanding", arXiv:1810.04805v2 [cs.CL] May 24, 2019, 16 pages.
Garg, et al., "TANDA: Transfer and Adapt Pre-Trained Transformer Models for Answer Sentence Selection", The Thirty-Fourth AAAI Conferences on Artificial Intelligence (AAAI-20), pp. 7780-7788.
Graves, et al., "Neural Turing Machines", arXiv: 1410.5401v2 [cs.NE] Dec. 10, 2014, Google DeepMind, London, UK, 26 pages.
Lai et al., "A Gated Self-attention Memory Network for Answer Selection", arXiv: 1909.09696v1 [cs.CL] Sep. 13, 2019, 7 pages.
Lai, et al., "A Review on Deep Learning Techniques Applied to Answer Selection", Proceedings of the 27th International Conference on Computational Linguistics, Aug. 20-28, 2018, pp. 2132-2144.
Lapuschkin, et al., "Unmasking Clever Hans predictors and assessing what machines really learn", Nature Communications, (2019) 10:1096, pp. 1-8.
Laskar, et al., "Contextualized Embeddings based Transformer Encoder for Sentence Similarity Modeling in Answer Selection Task", Proceedings of the 12th Conference on Language Resources and Evaluation (LREC 2020), pp. 5505-5514, Marseille, May 11-16, 2020.
Liu et al., "RoBERTa: A Robustly Optimized BERT Pretraining Approach", arXiv:1907.11692v1 [cs.CL] Jul. 26, 2019, 13 pages.
Madabushi, et al., "Integrating Question Classification and Deep Learning for improved Answer Selection", Proceedings of the 27th International Conference on Computational Linguistics, pp. 3283-3294, Santa Fe, New Mexico, USA, Aug. 20-26, 2018.
Pl?tz, et al., "Neural Nearest Neighbors Networks", 32nd Conference on Neural Information Processing Systems (NeurIPS 2018), Montréal, Canada, pp. 1-12.
Rao, et al., "Bridging the Gap Between Relevance Matching and Semantic Matching for Short Text Similarity Modeling", Proceedings of the 2019 Conference on Empirical Methods in Natural Language Processing and the 9th International Joint Conference on Natural Language Processing, pp. 5370-5381, Hong Kong, China, Nov. 3-7, 2019.
Ravi, et al., "Optimization As A Model For Few-Shot Learning", Twitter, Cambridge, USA, 11 pages.
Snell, et al., "Prototypical Networks for Few-shot Learning", 31st Conference on Neural Information Processing Systems (NIPS 2017), Long Beach, CA, USA, 11 pages.
Stolcke, et al., "Dialogue Act Modeling for Automatic Tagging and Recognition of Conversational Speech", Speech Technology and Research Laboratory, SRI International, 333 Ravenswood Ave., Menlo Park, CA, vol. 26, No. 3, 48 pages.
Sundararajan, et al., "Axiomatic Attribution for Deep Networks", Proceedings of the 34th International Conference on Machine Learning, Sydney, Australia, PMLR 70, 2017, arXiv:1703.01365v2 [cs.LG] Jun. 13, 2017, 11 pages.
Tay, et al., "Hyperbolic Representation Learning for Fast and Efficient Neural Question Answering", arXiv:1707.07847v3 [cs.IR] Nov. 23, 2017, 9 pages.
Tay, et al., "Multi-Cast Attention Networks for Retrieval-based Question Answering and Response Prediction", arXiv:1806.00778v1 [cs.CL] Jun. 3, 2018, 10 pages.
Tran, et al., "The Context-dependent Additive Recurrent Neural Net", Proceedings of NAACL-HLT 2018, pp. 1274-1283, New Orleans, Louisiana, Jun. 1-6, 2018.
Vinyals, et al., "Matching Networks for One Shot Learning", 30th Conference on Neural Information Processing Systems (NIPS 2016), Barcelona, Spain, pp. 1-9.
Wang, et al., "What is the Jeopardy Model? A Quasi-Synchronous Grammar for QA", Proceedings of the 2007 Joint Conference on Empirical Methods in Natural Language Processing and Computational Natural Language Learning, pp. 22-32, Prague, Jun. 2007.
Yang, et al., "WIKiQA: A Challenge Dataset for Open-Domain Question Answering", Proceedings of the 2015 Conference on Empirical Methods in Natural Language Processing, pp. 2013-2018, Lisbon, Portugal, Sep. 17-21, 2015.
Zhang, et al., "Examining CNN Representations With Respect To Dataset Bias", arXiv:1710.10577v2 [cs.CV] Nov. 22, 2017, 11 pages.
Zhang, et al., "Interpretable Convolutional Neural Networks", University of California, Los Angeles, pp. 8827-8836.

* cited by examiner

MEMORY-BASED NEURAL NETWORK FOR QUESTION ANSWERING

BACKGROUND

The following relates generally to automated question answering, and more specifically to a neural network for automated question answering.

Automated question answering refers to the task of providing an appropriate answer to a natural language query using a computer system. In some cases, neural networks may be used to perform question answering task. However, neural network processing for such applications may involve significant computation costs. This may prevent the use of neural networks for real-time question answering applications in power limited systems.

Furthermore, neural networks may provide results that are difficult to interpret. For example, it may be difficult to identify reasons why a neural network provided a particular answer to a question. This can impede improvement of the question answering systems. Therefore, there is a need for efficient question answering systems that provide improved explain ability.

SUMMARY

The present disclosure provides a memory-based neural network for question answering. Embodiments of the disclosure identify meta-evidence nodes in an embedding space, where the meta-evidence nodes represent salient features of a training set. Each element of the training set may include a questions appended to a ground truth answer. In some examples, a neural Turing machine (NTM) reads a dataset and summarizes the dataset into a few meta-evidence nodes. A subsequent question may be appended to multiple candidate answers to form an input phrase, which may also be embedded in the embedding space. Then, corresponding weights may be identified for each of the meta-evidence nodes. The embedded input phrase and the weighted meta-evidence nodes may be used to identify the most appropriate answer.

A method, apparatus, non-transitory computer readable medium, and system for neural network for question answering are described. Embodiments of the method, apparatus, non-transitory computer readable medium, and system are configured to identify a plurality of input phrases corresponding to a natural language query, wherein each of the input phrases comprises the natural language query and a candidate answer from a set of candidate answers, generate a support vector for each of the input phrases, wherein the support vector comprises a weighted sum of a plurality of meta-evidence nodes in an embedding space, and wherein the meta-evidence nodes summarize a set of training data, and select an answer to the natural language query from the set of candidate answers based on the support vector for each of the input phrases.

An apparatus, system, and method for neural network for question answering are described. Embodiments of the apparatus, system, and method may include an embedding network configured to embed input phrases corresponding to a natural language query into an embedding space, wherein each of the input phrases comprises the natural language query and a candidate answer from a set of candidate answers, a memory controller configured to generate a support vector for the input phrases, wherein the support vector comprises a weighted sum of a plurality of meta-evidence nodes in the embedding space, and wherein the meta-evidence nodes summarize a set of training data, and an answer selection module configured to select an answer to the natural language query from the set of candidate answers based on the support vector for each of the input phrases.

A method, apparatus, non-transitory computer readable medium, and system for neural network for question answering are described. Embodiments of the method, apparatus, non-transitory computer readable medium, and system are configured to receive a training set comprising a plurality of training phrases, wherein each of the training phrases comprises a natural language query combined with a ground truth answer, generate a plurality of meta-evidence nodes based on at least some of the training phrases using a neural Turing machine, generate an input phrase for at least one of the training phrases by combining the natural language query with a plurality of candidate answers, generate a support vector for the input phrase using a memory controller, wherein the support vector comprises a weighted sum of the meta-evidence nodes, select a predicted answer to the natural language query from the candidate answers based on the support vector, compute a loss function by comparing the predicted answer to ground truth answer, and update parameters of the neural Turing machine and the memory controller based on the loss function.

DETAILED DESCRIPTION

The present disclosure relates to automated question answering. Embodiments of the present disclosure provide an explainable, evidence-based memory network architecture for answering natural language queries. For example, some embodiments learn to summarize a dataset using a set of meta-evidence nodes. A weighted sum of the meta-evidence nodes is selected to represent an input phrase (i.e., a combination of a question and a candidate answer). A neural network decoder may then select an appropriate answer based on the input phrase and the weighted sum.

Question answering, or answer selection, is the task of identifying the correct answer to a question from a pool of candidate answers. Some question answering systems use machine learning to train neural networks to perform the question answering task. However, conventional question answering networks operate in a way that is difficult for humans to understand. That is, conventional question answering networks operate like a "black box" with a huge number of parameters that provide little or no insight as to why one answer was selected over another.

Interpretability and explainability of deep neural networks are challenging due to both scale and complexity. These networks can have hundreds of millions of parameters that are self-organized in complex ways. The large number of parameters and the complexity of the architectures prevent humans from directly understanding how the networks truly operate. The lack of explainable intuition inhibits improvement of the network. Furthermore, people may not trust a deep neural network that they cannot understand, and this lack of trust can limit adoption.

By contrast, embodiments of the present disclosure include a neural network that provides actionable insight into its own operation. For example, a question answering network concatenates natural language questions with multiple candidate answers to generate multiple input phrases. These input phrases are then embedded into a vector space. The question answer network may then identify the input phrase containing the correct answer. However, instead of classifying the embedded input phrases directly, embodiments of the present disclosure summarize a training set into a relatively small number of meta-evidence nodes represented in the same vector space (i.e., an embedding space). The network then decodes a combination of the embedded input phrase and a weighted sum of the meta-evidence nodes.

The meta-evidence nodes lend support and explainability to the predictions by identifying which training examples (or clusters of training examples) contributed to the selected answer. As a result, embodiments of the present disclosure provide high predictive power and achieve improved results on a variety of answer selection datasets. As a result, the output of the question answering network is interpretable by a human user. For example, a user may determine which training examples result in misclassified input phrases, and use this understanding to improve the network (e.g., by removing training examples that lead to errors).

In some cases, the meta-evidence nodes are generated using a neural Turing machine (NTM) architecture. The parameters of the NTM may be jointly trained with other parameters of the network. For example, the NTM may be a component of a memory controller network that is trained to identify the meta-evidence nodes, select weights for each of the meta-evidence nodes corresponding to a particular input phrase, and classify each input phrase. In some examples, the classification is a binary classification used to determine whether each input phrase contains an appropriate answer.

Example Question Answering System

Figure 1:
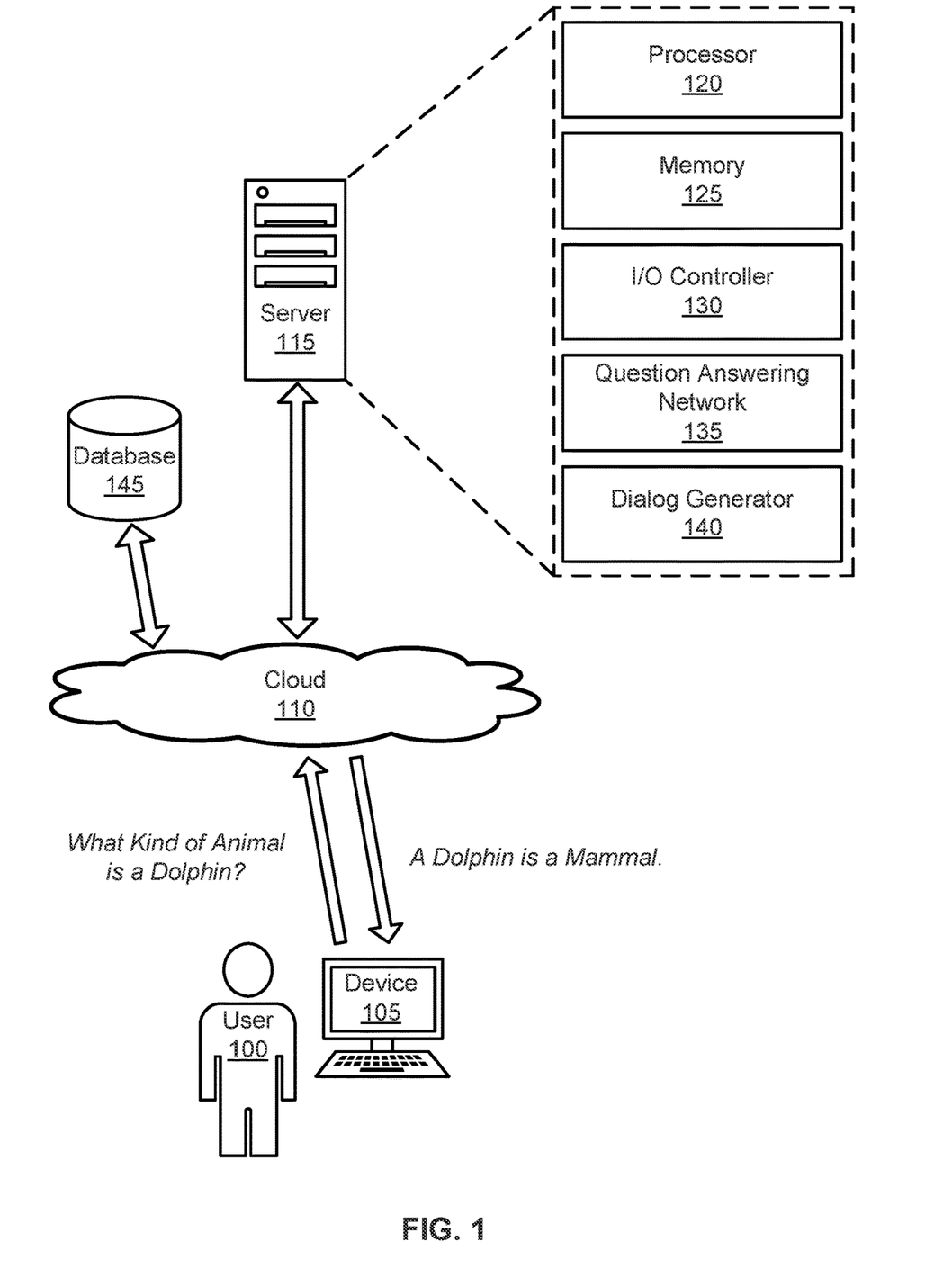
FIG. 1 shows an example of a system including a question answering network according to aspects of the present disclosure.

FIG. 1 shows an example of a system including a question answering network according to aspects of the present disclosure. The example shown includes user 100, device 105, cloud 110, server 115, and database 145. For example, a user 100 may use a device 105 that is in communication with a server 115 and a database 145 via cloud 110. The server 115 may include a question answering network 135.

In some examples, a natural language query is received from the user 100 (e.g., during an automated dialogue with the user 100 in a chat application). For example the user may ask "what kind of animal is a dolphin?" The server may then identify input phrases corresponding to a natural language query.

Each input phrase may include the natural language query and a candidate answer. For example, the input phrases may include "what kind of animal is a dolphin? mammal" and "what kind of animal is a dolphin? fish." In some cases, the candidate answers are stored in the database 145. In other examples, a component of the server 115 may generated the candidate answers.

The server 115 may then generate a support vector for each of the input phrases that includes a weighted sum of meta-evidence nodes. In some cases, the meta evidence nodes are vectors that represent clusters of training examples. The meta-evidence nodes may represent features of the input phrases, as opposed to simply representing the candidate answers. For example, one meta-evidence node may represent a cluster including the training phrases such as "what kind of animal is a whale? mammal" and "what kind of animal is an orca? mammal." Other meta-evidence nodes may include "what kind of animal is a bear? mammal" or "what kind of animal is a shark? fish."

In some embodiments, the support vector includes weights corresponding to each of the meta-evidence nodes. For example, the support vector may be a weighted sum of the meta-evidence nodes. The server 115 may select an answer to the natural language query based on the support vector. For example, the server 115 may combine an embedded representation of the input phrase with the support vector, and use the combined vector as input for a decoder. Then the server 115 may decode the combined vector and select the appropriate candidate answer (i.e., "mammal").

According to some embodiments, the server may include a dialog generator 140 that generates a response to the natural language query based on the selected answer. For example, the dialog generator 140 may generate the response "a dolphin is a mammal" based on the selected candidate answer.

In some embodiments, the question answering task is performed by question answering network 135. The question answering network 135 provides an explainable, evidence-based memory network architecture that can summarize a training dataset and extract supporting evidence (i.e., the meta-evidence nodes) to make a decision. In some examples, the question answering network 135 includes a neural Turing machine (NTM) that summarizes the training set. The parameters of the NTM may be jointly trained with other parameters of the network. Further detail regarding the neural network model and architecture are described with reference to FIGS. 3 and 4.

By identifying the meta-evidence nodes prior to classifying the input phrases, the question answering network 135 can achieve state-of-the-art performance, while also providing insight into the functioning of the network. For example, by identifying which meta-evidence nodes contributed to a decision, an operator of the question answering network 135 can trace errors to the training instances that caused these errors.

The device 105 may include a computing device such as a personal computer, laptop computer, mainframe computer, palmtop computer, personal assistant, mobile device, or any other suitable processing apparatus. A user interface may enable a user 100 to interact with a device 105. In some cases, a user interface may be a graphical user interface (GUI). In some embodiments, the user interface may include an audio device, such as an external speaker system, an external display device such as a display screen, or an input device. An input device may be a computer mouse, keyboards, keypads, trackballs, and voice recognition devices. An input component may include any combination of devices that allow users 100 to input information into a computing device 105, such as buttons, a keyboard, switches, and/or dials. In addition, the input component may include a touch-screen digitizer overlaid onto the display that can sense touch and interact with the display. In some embodiments, the question answering network 135 is located on the device 105.

The cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers 115. The server 115 may be designated an edge server 115 if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A database 145 is an organized collection of data. For example, the data base 145 may store training examples, and candidate answers. In some cases, the database 145 stores data in a specified format known as a schema. A database 145 may be structured as a single database 145, a distributed database 145, multiple distributed databases 145, or an emergency backup database 145. In some cases, a database controller may manage data storage and processing in a database 145. In some cases, a user 100 interacts with a database controller. In other cases, a database controller may operate automatically without user 100 interaction.

A server 115 provides one or more functions to users 100 linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device, a personal computer, a laptop computer, a mainframe computer, a supercomputer, or any other suitable processing apparatus.

In one embodiment, server 115 includes processor 120, memory 125, I/O controller 130, question answering network 135, and dialog generator 140.

A processor 120 is an intelligent hardware device (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 120 is configured to operate a memory 125 (e.g., a memory array) using a memory controller. In other cases, a memory controller is integrated into the processor 120. In some cases, the processor 120 is configured to execute computer-readable instructions stored in a memory 125 to perform various functions. In some embodiments, a processor 120 includes special purpose components for modem processing, baseband processing, digital signal processing, or transmission processing.

Examples of memory 125 include random access memory (RAM), read-only memory (ROM), or a hard disk. Examples of memory 125 include solid state memory and a hard disk drive. In some examples, memory 125 is used to store computer-readable, computer-executable software including instructions that, when executed, cause a processor 120 to perform various functions described herein. In some cases, the memory 125 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 125 store information in the form of a logical state.

An I/O controller 130 may manage input and output signals for a device 105. In some cases, a user 100 and/or device 105 may interact with a server 115 via I/O controller 130 or via hardware components controlled by an I/O controller 130. I/O controller 130 may also manage peripherals not integrated into a device 105. In some cases, an I/O controller 130 may represent a physical connection or port to an external peripheral. In some cases, an I/O controller 130 may utilize an operating system such as iOS®, ANDROID®, MS-DOS®, MS-WINDOWS®, OS/2®, UNIX®, LINUX®, or another known operating system. In other cases, an I/O controller 130 may represent or interact with a modem, a keyboard, a mouse, a touchscreen, or a similar device 105. In some cases, an I/O controller 130 may be implemented as part of a processor 120.

In some cases, the server 115 includes an artificial neural network (ANN). A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An ANN may include a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some cases, the server 115 may include a neural processing unit (NPU) that specializes in the acceleration of machine learning algorithms such as those utilized by the question answering network 135. For example, the server 115 may include predictive models such as an artificial neural networks (ANN). In some cases, an NPU is designed in a way that makes it unsuitable for general purpose computing such as that performed by a Central Processing Unit (CPU).

In some embodiments, software may be used to implement aspects of the present disclosure. Software may be stored in a non-transitory computer-readable medium such as system memory 125 or other memory 125. In some cases, the software may not be directly executable by the processor 120 but may cause a computer (e.g., when compiled and executed) to perform functions described herein.

According to some embodiments, question answering network 135 receives the natural language query from a user 100. In some examples, question answering network 135 concatenates the natural language query with each of the candidate answers to form the input phrases. Then, question answering network 135 generates weights of the support vector for each of the meta-evidence nodes using a neural network.

To train the question answering network 135 a training set is identified including a set of training phrases, where each of the training phrases includes a natural language query combined with a ground truth answer. Then, question answering network 135 generates a set of meta-evidence nodes based on at least some of the training phrases (e.g., using a neural Turing machine).

During the training, question answering network 135 generates an input phrase for the training phrases by combining a natural language query with a set of candidate answers. Then, question answering network 135 generates a support vector that includes a weighted sum of the meta-evidence nodes, and selects a predicted answer to the natural language query from the candidate answers based on the support vector. A loss function is the computed by comparing the predicted answer to ground truth answer, and parameters of the question answering network 135 are iteratively updated based on the loss function.

In some examples, question answering network 135 determines that a predicted answer is incorrect and selects one or more meta-evidence nodes that contributed to selecting the answer. Based on the selected meta-evidence nodes, question answering network 135 can identify a data point in the set of training data that contributed to selecting the answer. In some examples, question answering network 135 removes the data point from the set of training data.

Figure 2:
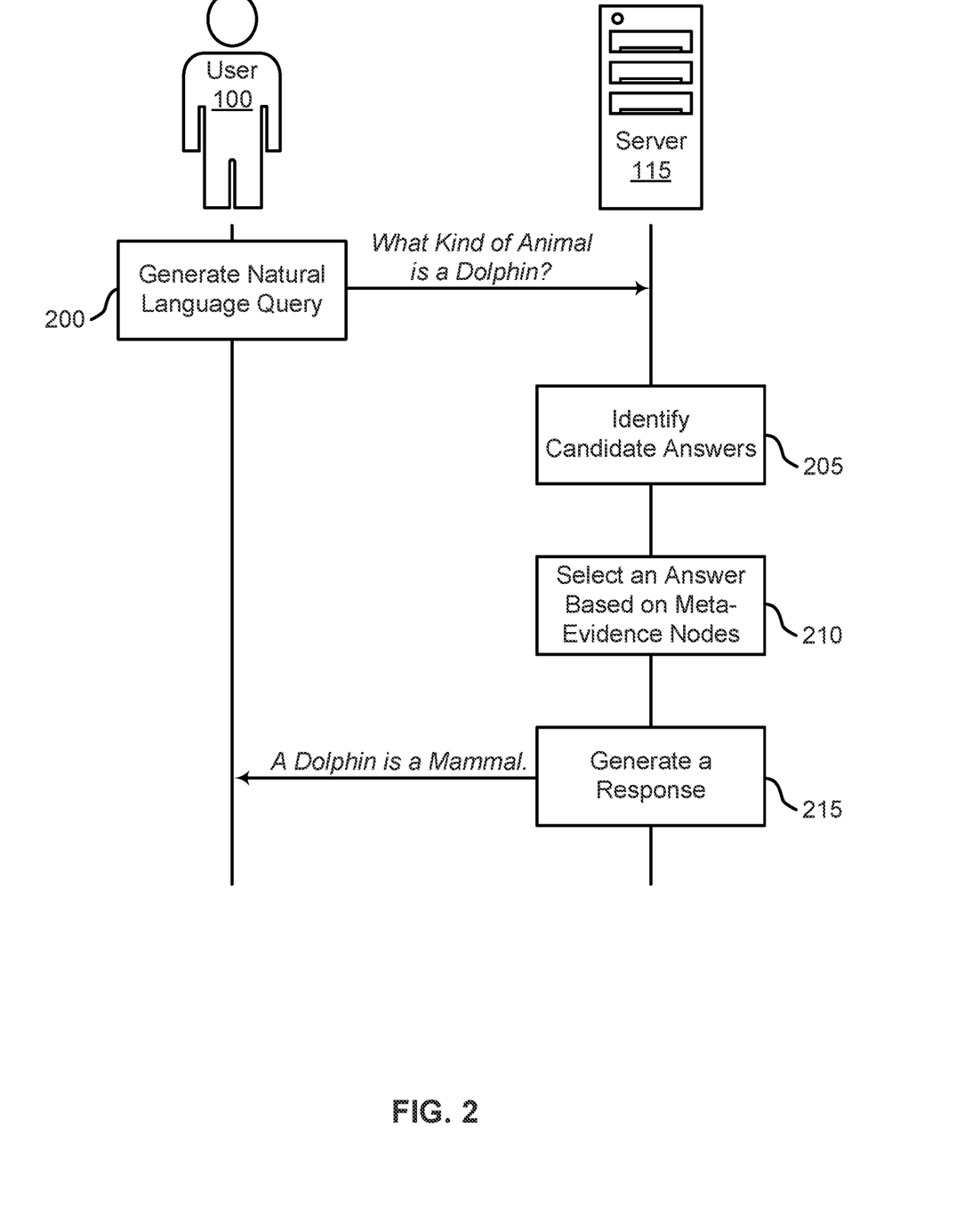
FIG. 2 shows examples of a process for automated question answering according to aspects of the present disclosure.

FIG. 2 shows an example of a process for automated question answering according to aspects of the present disclosure. In some examples, these operations are performed by a system including a processor executing a set of codes to control functional elements of an apparatus. For example, the system may include a user 200 and a server 205. User 100 is an example of, or includes aspects of, the corresponding element described with reference to FIG. 1. Server 115 is an example of, or includes aspects of, the corresponding element described with reference to FIG. 1.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, user 100 may provide a natural language query (e.g., a question) and send the natural language query to server 115. A natural language query refers to any query posed by a user 100 in natural language (e.g., a query or search string in terms of a user's natural language, without any special syntax or format). Alternatively, natural language queries may be generated by automated systems to simulate user queries. As an example, a natural language query may include a query such as "what kind of animal is a dolphin?" In some cases, the operations of this step refer to, or may be performed by, a user as described with reference to FIG. 1.

At operation 205, server 115 may identify candidate answers for the natural language query received at operation 200. For instance, server 115 may identify multiple input phrases corresponding to the natural language query. Each input phrases may include the natural language query and a candidate answer from a set of candidate answers. For example, the input phrases may include "what kind of animal is a dolphin? mammal" and "what kind of animal is a dolphin? fish." In some cases, the operations of this step refer to, or may be performed by, a server 115 as described with reference to FIG. 1, an embedding network as described with reference to FIG. 4, or both.

At operation 210, server 115 selects an answer to the natural language query using pre-determined meta-evidence nodes. For instance, server 115 may generate a support vector for each of the input phrases, where the support vector includes a weighted sum of a set of meta-evidence nodes in an embedding space (and where the meta-evidence nodes summarize a set of training data). In some cases, the meta evidence nodes are vectors that represent clusters of training examples. The meta-evidence nodes may represent features of the input phrases, as opposed to simply representing the candidate answers. For example, one meta-evidence node may represent a cluster including the training phrases such as "what kind of animal is a whale? mammal" and "what kind of animal is an orca? mammal." Other meta-evidence nodes may include "what kind of animal is a bear? mammal" or "what kind of animal is a shark? fish."

Server 115 may then select an answer to the natural language query from the set of candidate answers based on the support vector for each of the input phrases. In the present example, server 115 selects an answer "mammal." In some cases, the operations of this step refer to, or may be performed by, any combination of a server 115 as described with reference to FIG. 1, as well as an answer selection module and memory controller as described with reference to FIG. 4.

At operation 215, server 115 may generate a response to the natural language query based on the answer selected at operation 210. For instance, server 115 may implement natural language processing to concatenate language (e.g., language from a database, language from the natural language query received at operation 200, etc.) with the selected answer in order to generate a response to the natural language query. In one example, server 115 generates the response "a dolphin is a mammal" in response to the natural language query. In some cases, the operations of this step refer to, or may be performed by, server 115 as described with reference to FIG. 1, an answer selection module as described with reference to FIG. 4, or both.

In some embodiments, the response to the natural language query is generated by a dialog generator 140, which may be distinct from the question answering network 135. In some examples, the question answering network selects an answer from among a plurality of answers, and then the dialog generator 140 generates dialog based on the selected answer. In other examples, a dialog generator may generate multiple candidate responses, and the question answering network 135 may select the most appropriate response from among the candidate responses.

Example Neural Network Architecture

Figure 3:
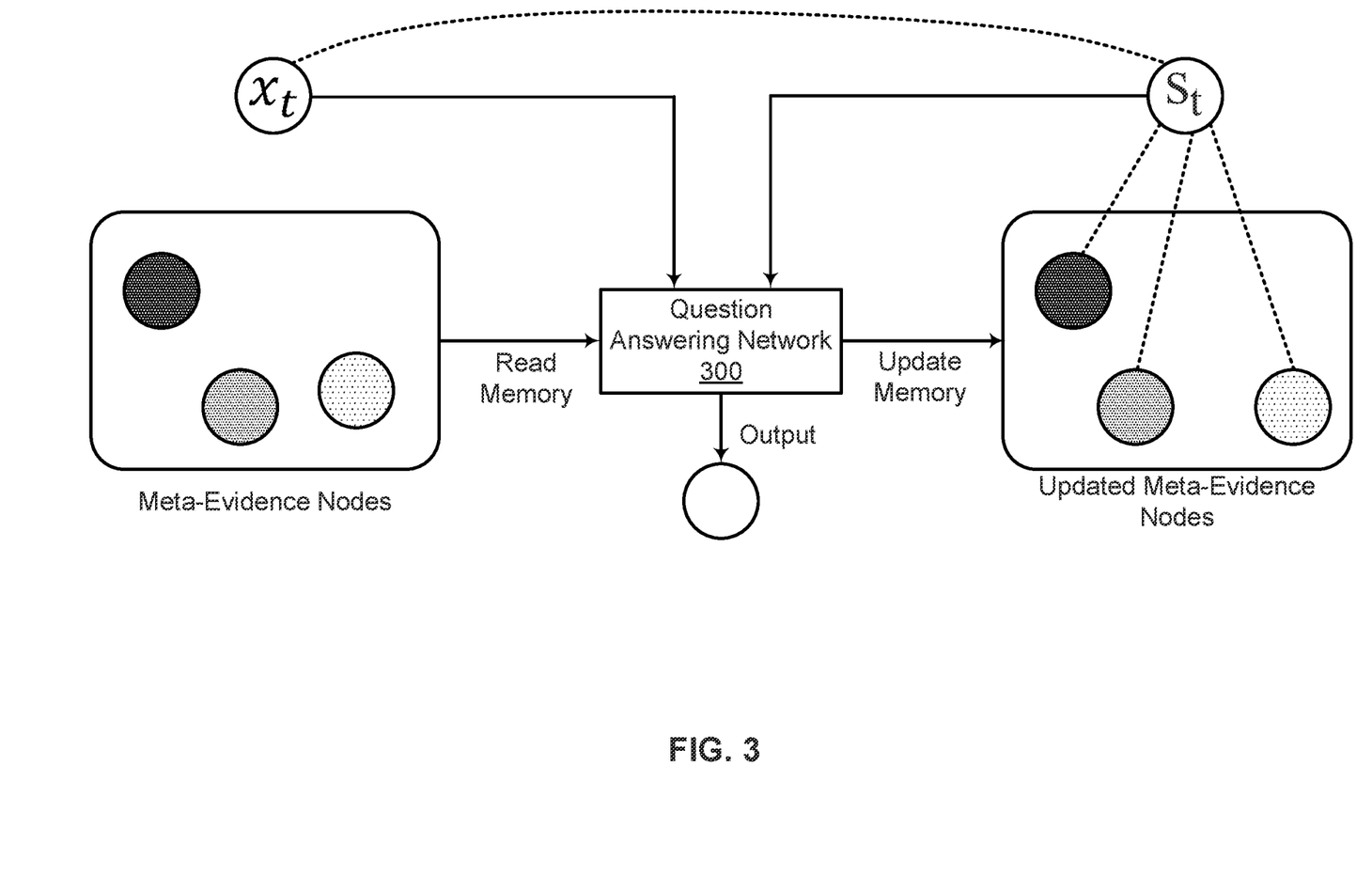
FIG. 3 shows examples of a model for a question answering network according to aspects of the present disclosure.

FIG. 3 shows an example of a model for a question answering network according to aspects of the present disclosure. Question answering network 300 is an example of, or includes aspects of, the corresponding element described with reference to FIGS. 1 and 4.

As discussed with reference to FIG. 1, a question answering network may include a neural network trained to identify meta-evidence nodes that represent a set of training phrases. In some supervised learning scenarios, performing a full distance calculation between the current data point and every training data point would be computationally intractable. To overcome this challenge, embodiments of the present disclosure provide a memory controller based on a neural Turing machine (NTM) to summarize the dataset into the meta-evidence nodes.

The controller includes both reading and writing mechanisms. For example, the controller may be provided with K cells $e_1, \ldots, e_K$ in a memory bank (i.e., to store K meta-evidence vectors). The controller may denote the t-th data point as $x^t$, where $x^t$ is obtained by using an embedding model to embed an input phrase (i.e., a concatenation of a question and a candidate answer).

The writing mechanism characterizes how the controller updates the memory given a new data point. In some embodiments, an indexing mechanism is used for updating the memory. In some examples, a simplified indexing procedure from the memory network may be used. For example, at time step t, for each incoming data point $x^t$, the attention weight $w_{e_i^t}$ is determined for the support vector $e_i^t$:

$$w_{e_i^t} = \frac{\exp(x^t \cdot e_i^t)}{\sum_{k=1}^{K} \exp(x^t \cdot e_k^t)} \quad (1)$$

From these attention weights, the writing index is determined for an input $x^t$ by maximizing the cosine similarity between $x^t$ and the evidence vectors:

$$k_{best}^t = \arg\max_i w_{e_i^t} \quad (2)$$

With the writing index found, the memory update weight is determined via a gating mechanism:

$$g^t = \epsilon \times \sigma((W_g \cdot e_{k_{best}}^t + b_g)(W_g \cdot x^t + b_g)) \quad (3)$$

where $\epsilon$ is a scalar, $\sigma$ is sigmoid function, and $W_g$ and $b_g$ are learnable parameters. The hyperparameter $\epsilon$ prevents the outliers from breaking the memory values. The memory update at time step t is formalized as:

$$e_{k_{best}}^{t+1} = g^t \cdot x_t + (1-g^t) \cdot e_{k_{best}}^t \quad (4)$$

The reading mechanism characterizes how the controller uses the memory and the current input to produce an output. Instead of reading one memory cell, embodiments of the present disclosure learn the support of meta-evidence nodes. Therefore, the weighted sum is used to create a support vector $s^t$:

$$s^t = \sum_{k=1}^{K} (w_{e_k^t} \cdot e_k^{t+1}) \quad (5)$$

The original input is then incorporated with the support vector $s^t$ to produce the negative/positive class probabilities $P(x^t)$ as follows:

$$P(x^t) = \text{softmax}(W_p(s^t \cdot x^t) + b_p) \quad (6)$$

The overall information flow of a model of the question answering network 300 is illustrated in FIG. 3. The formulation may be based on an NTM and a memory network. The indexing algorithms in writing and reading mechanisms are similar to the memory network, which may be simpler than an NTM. Further details regarding an example architecture for the question answering network are shown with respect to FIG. 4.

Figure 4:
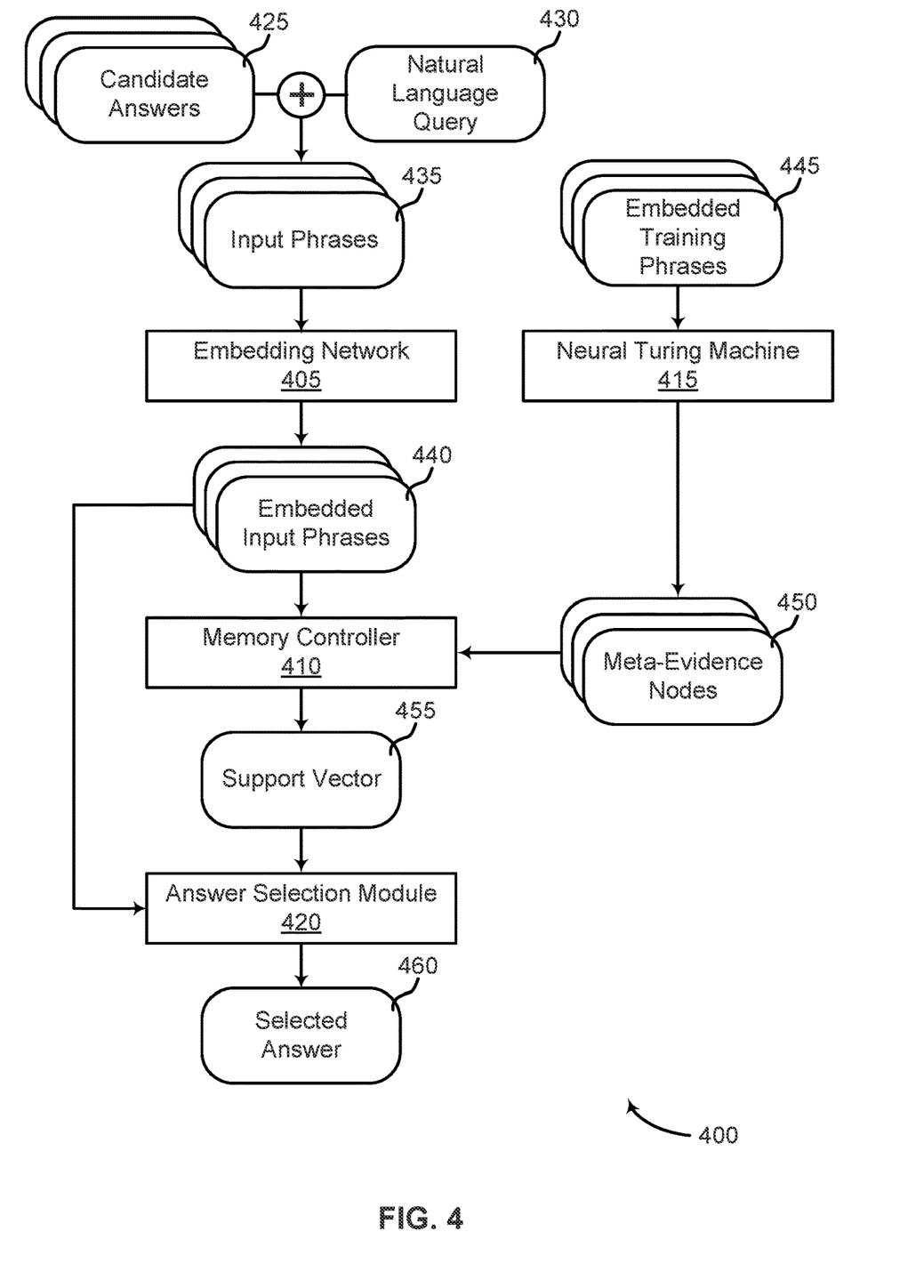
FIG. 4 shows an example of a question answering network according to aspects of the present disclosure.

FIG. 4 shows an example of a question answering network 400 according to aspects of the present disclosure. The example shown includes question answering network 400. In one embodiment, question answering network 400 includes embedding network 405, memory controller 410, neural Turing machine 415, and answer selection module 420. The example shown also includes candidate answers 425, natural language query 430, input phrases 435, embedded input phrases 440, embedded training phrases 445, meta-evidence nodes 450, support vector 455, and selected answer 460. Question answering network 400 is an example of, or includes aspects of, the corresponding element described with reference to FIGS. 1 and 3.

As described herein, the present disclosure provides a neural network architecture (e.g., a question answering network 400) that achieves improved performance on datasets (e.g., such as QA datasets) and shows strong error-tracing performance. Embodiments of the present disclosure may be applied to different noisy user-generated datasets to test and further improve interpretability.

According to some embodiments, embedding network 405 identifies a set of input phrases 435 corresponding to a natural language query 430, where each of the input phrases 435 includes the natural language query 430 and a candidate answer from a set of candidate answers 425. In some examples, embedding network 405 embeds the input phrases 435 into the embedding space using an embedding model, resulting in embedded input phrases 440. According to some embodiments, embedding network 405 is configured to embed input phrases 435 corresponding to a natural language query 430 into an embedding space, wherein each of the input phrases 435 comprises the natural language query 430 and a candidate answer from a set of candidate answers 425.

A word embedding is a learned representation for text where words that have the same meaning have a similar representation. In some examples, each word is represented as a separate vector in a vector space, and in other examples, a single vector is used to represent a phrase, such as a natural language query. In some cases, the vector space may have a large number of dimensions. The vectors are positioned in the vector space in a manner such that similar words or phrases are located nearby in the vector space. In some cases, an embedding space may include syntactic or context information in additional to semantic information for individual words.

According to some embodiments, memory controller 410 generates a support vector 455 for each of the input phrases 435, where the support vector 455 includes a weighted sum of a set of meta-evidence nodes 450 in an embedding space, and where the meta-evidence nodes 450 summarize a set of training data. In some examples, a number of the meta-evidence nodes 450 is greater than a number of the candidate answers 425.

According to some embodiments, memory controller 410 is configured to generate a support vector 455 for the input phrases 435, wherein the support vector 455 comprises a weighted sum of a plurality of meta-evidence nodes 450 in the embedding space, and wherein the meta-evidence nodes 450 summarize a set of training data.

According to some embodiments, neural Turing machine 415 summarizes the training data using a neural Turing machine 415 to produce the meta-evidence nodes 450. In some examples, each of the meta-evidence nodes 450 represents a cluster of points from the training data in the embedding space (e.g., embedded training phrases 445). In some examples, neural Turing machine 415 updates the meta-evidence nodes 450 after removing the data point. According to some embodiments, neural Turing machine 415 is configured to select the meta-evidence nodes 450 based on the set of training data. In some examples, the neural Turing machine 415 is trained together with the memory controller 410.

According to some embodiments, answer selection module 420 selects an answer 460 to the natural language query 430 from the set of candidate answers 425 based on the support vector 455 for each of the input phrases 435. In some examples, answer selection module 420 combines an input vector representing of each of the input phrases 435 in the embedding space with the corresponding support vector 455 to produce a combined vector. In some examples, answer selection module 420 ads a bias vector to the combined vector to produce a biased combined vector. In some examples, answer selection module 420 applies a softmax function to the biased combined vector to produce a probability value, where the answer 460 is selected based on the probability value. In some examples, answer selection module 420 updates the meta-evidence nodes 450 based on the selected answer 460.

According to some embodiments, answer selection module 420 is configured to select an answer 460 to the natural language query 430 from the set of candidate answers 425 based on the support vector 455 for each of the input phrases 435.

In some examples, the question answering network 300 stores intermediate computation steps in the memory, and these memories can be considered as internal layers of the network. Additionally, or alternatively, the memory component of the present disclosure is external and not trained and is updated by the writing mechanism. As a result, the memory bank of an embodiment of the present disclosure is similar to the NTM.

Embodiments of the present disclosure may be evaluated on datasets such as WikiQA and TrecQA. Various measures, such as mean average precision (MAP) and mean reciprocal rank (MRR), may be used. Some embodiments of the present disclosure use the RoBERTa contextual embedding, pretrained on the ANSQ dataset. The number of memory cells may vary from, for example, 2 to 64. The base configuration with 2 memory cells mimics the prototypical network with one cell for each prototype class representation. In this configuration, the question answering network 300 outperforms conventional models. In some cases, increasing the number of memory cells beyond the basic 2 cells (i.e., one for each class) may be beneficial. In some examples, the performance peaks at 16 or 32 cells, depending on the dataset.

The evidence-based model of the present disclosure can interpret the output of the neural network, though quantifying the interpretability of different models may be difficult. A potential application of interpretability in real-life development of a deep neural network may be used to create a benchmark for interpretability.

Data collection is a process in a machine learning model's development cycle. Collected data is not always clean and consistent, either due to errors made by annotators or equivocal data points. For example, a Switchboard Dialog Act dataset has 84% inter-annotator agreement. Therefore, different models may be tested to identify noisy instances in the dataset.

Embodiments of the question answering network 300 naturally learns the most supportive group of instances, given a new instance. Therefore, embodiments of the present disclosure trace from a validation error to a group of training instances. The training samples of that group may be tested, but testing would quickly make the number of samples too high. As a result, embodiments of the present disclosure use heuristics.

In one example, the top k most similar instances are tested (by cosine distance in the embedding space) from the most relevant group. For instance, 10% of the labels in each training set may be randomly swapped to create a noisy dataset given current QA datasets. The percentage of validation errors that the model can correctly trace back to the training set perturbation is then calculated. For a quantitative benchmark, the model of the present disclosure is compared to a baseline, such as the RoBERTa+ANSQ transfer model, and the top k most similar representations.

Embodiments of the present disclosure shows error-tracing capability and improved performance. On certain datasets (e.g., QA datasets), embodiments of the present disclosure can trace 90% or more of the errors to the perturbed data points. Therefore, forcing a model to provide direct evidence provides for the identification of noisy training instances.

Example Question Answering Techniques

Figure 5:
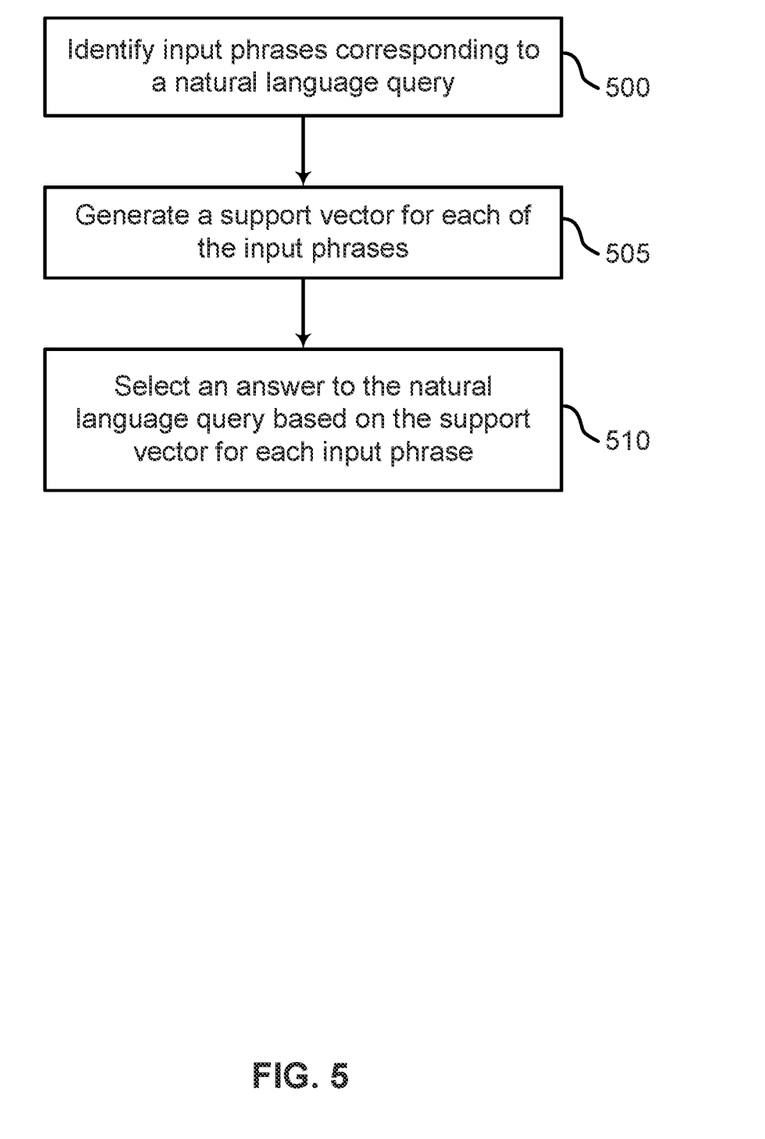
FIGS. 5 and 6 show examples of a process for question answering according to aspects of the present disclosure.

FIG. 5 shows an example of a process for question answering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system identifies input phrases corresponding to a natural language query. For instance, each of the input phrases may include the natural language query and a candidate answer from a set of candidate answers. In some cases, the operations of this step refer to, or may be performed by, an embedding network as described with reference to FIG. 4.

For example, a user 100 may provide a natural language query, and send the natural language query to a server 115 (e.g., via a dialogue application)). As an example, a natural language query may include a query such as "what kind of animal is a dolphin?" The server 115 may identify candidate answers for the natural language query. For example, the input phrases may include "what kind of animal is a dolphin? mammal" and "what kind of animal is a dolphin? fish."

At operation 505, the system generates a support vector for each of the input phrases. For instance, the system generates a support vector for each of the input phrases, where the support vector includes a weighted sum of a set of meta-evidence nodes in an embedding space, and where the meta-evidence nodes summarize a set of training data. In some cases, the operations of this step refer to, or may be performed by, a memory controller as described with reference to FIG. 4.

In one example, a server 115 selects an answer to the natural language query using pre-determined meta-evidence nodes. For instance, server 115 may generate a support vector for each of the input phrases, where the support vector includes a weighted sum of a set of meta-evidence nodes in an embedding space (and where the meta-evidence nodes summarize a set of training data). The meta evidence nodes may be vectors that represent clusters of training examples. For example, one meta-evidence node may represent a cluster including the training phrases such as "what kind of animal is a whale? mammal" and "what kind of animal is an orca? mammal." Other meta-evidence nodes may include "what kind of animal is a bear? mammal" or "what kind of animal is a shark? fish."

At operation 510, the system selects an answer to the natural language query based on the support vector for each input phrase. For instance, the system selects an answer to the natural language query from the set of candidate answers based on the support vector for each of the input phrases. In some cases, the operations of this step refer to, or may be performed by, an answer selection module as described with reference to FIG. 4. For example, a server 115 may select the answer "mammal."

Figure 6:
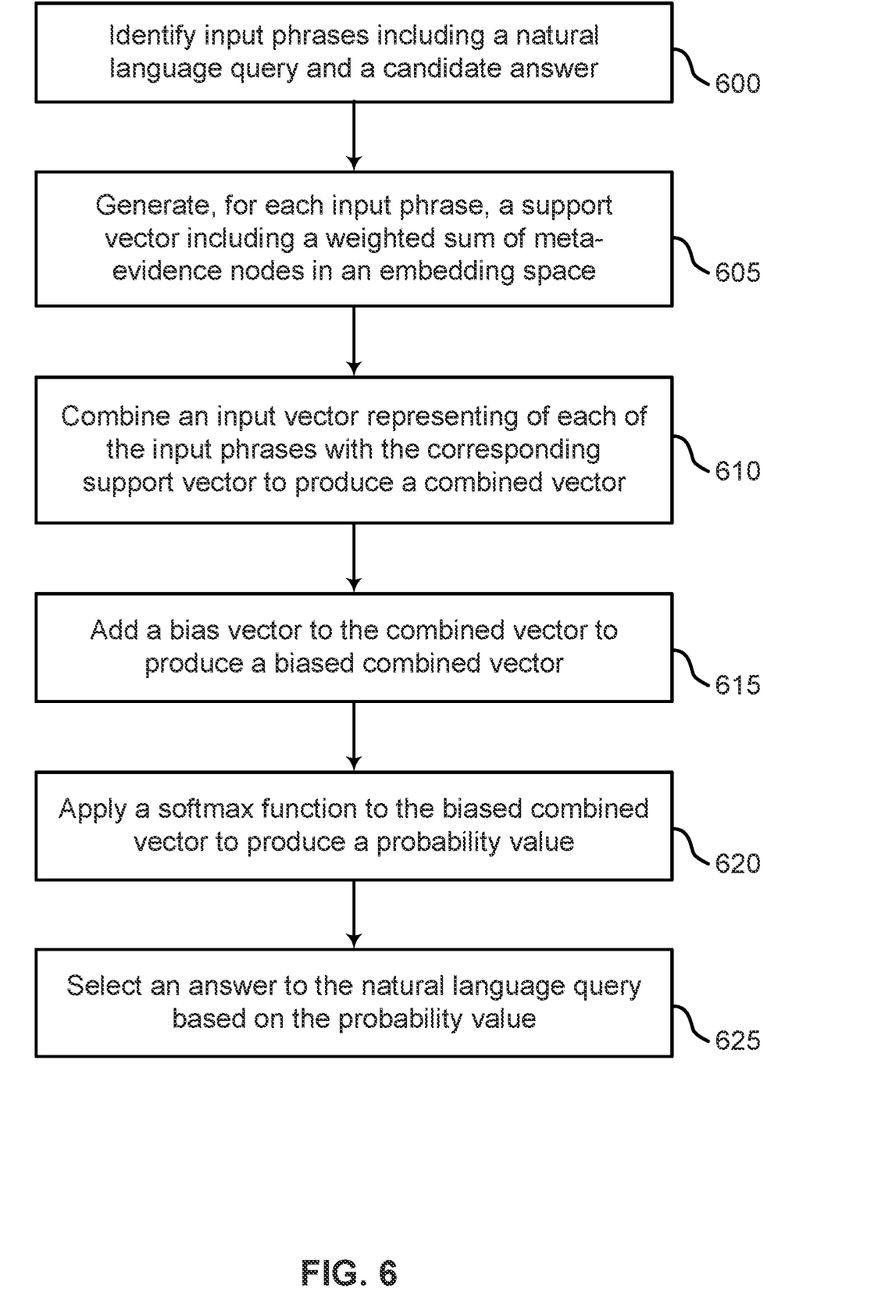

FIG. 6 shows an example of a process for question answering according to aspects of the present disclosure. The example described in FIG. 6 is an example of the method described in FIG. 5 that provides additional detail regarding an example process for selecting an answer based on an input phrase.

At operation 600, the system identifies a set of input phrases corresponding to a natural language query, where each of the input phrases includes the natural language query and a candidate answer from a set of candidate answers. In some cases, the operations of this step refer to, or may be performed by, an embedding network as described with reference to FIG. 4.

At operation 605, the system generates a support vector for each of the input phrases, where the support vector includes a weighted sum of a set of meta-evidence nodes in an embedding space, and where the meta-evidence nodes summarize a set of training data. In some cases, the operations of this step refer to, or may be performed by, a memory controller as described with reference to FIG. 4.

At operation 610, the system combines an input vector representing of each of the input phrases in the embedding space with the corresponding support vector to produce a combined vector. In some cases, the operations of this step refer to, or may be performed by, an answer selection module as described with reference to FIG. 4.

At operation 615, the system ads a bias vector to the combined vector to produce a biased combined vector. In some cases, the operations of this step refer to, or may be performed by, an answer selection module as described with reference to FIG. 4.

At operation 620, the system applies a softmax function to the biased combined vector to produce a probability value. In some cases, the operations of this step refer to, or may be performed by, an answer selection module as described with reference to FIG. 4.

At operation 625, the system selects an answer to the natural language query from the set of candidate answers based on the probability value. In some cases, the operations of this step refer to, or may be performed by, an answer selection module as described with reference to FIG. 4.

Example Neural Network Training Techniques

Figure 7:
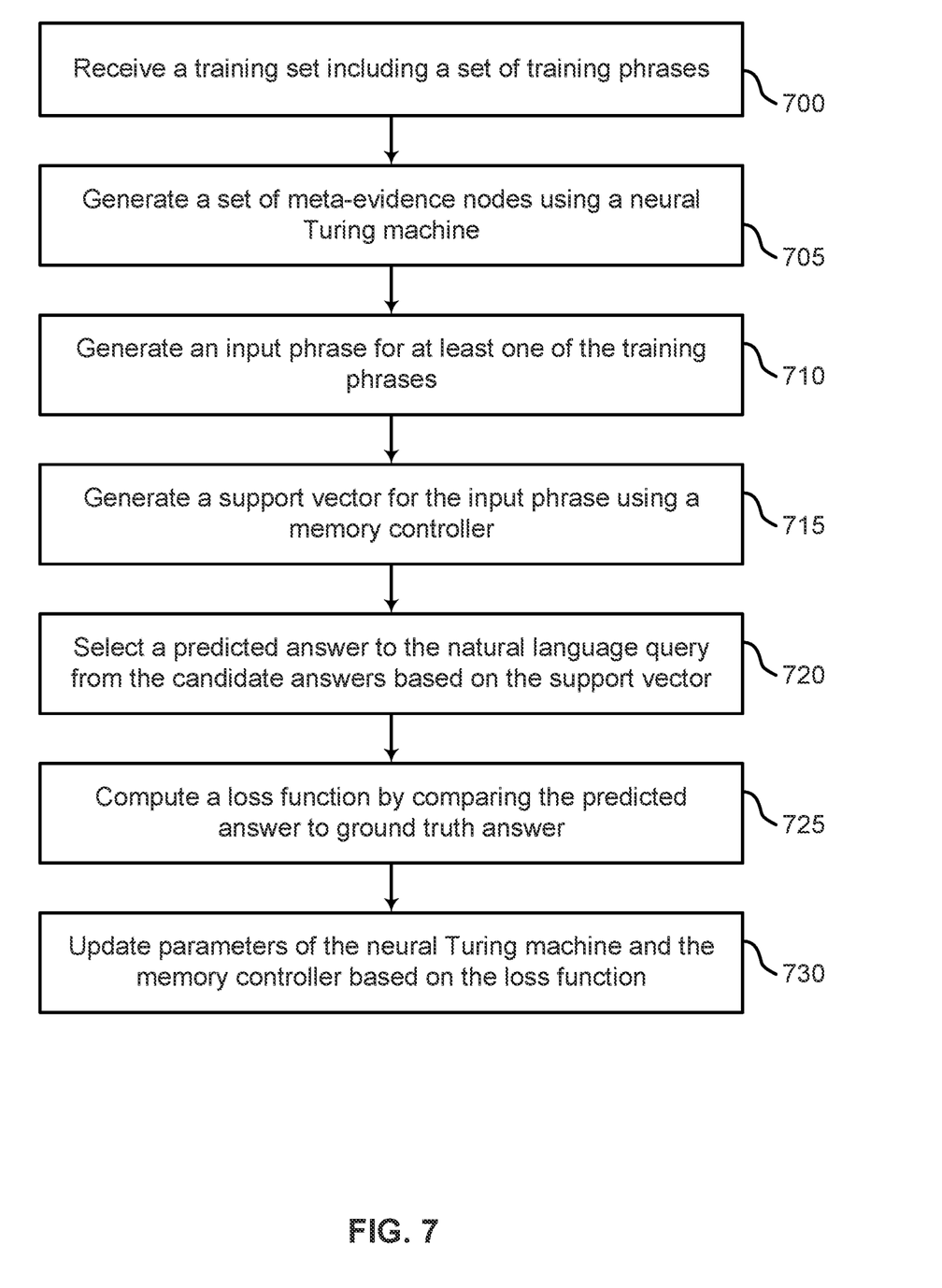
FIG. 7 shows an example of a process for training a neural network for question answering according to aspects of the present disclosure.

FIG. 7 shows an example of a process for training a neural network for question answering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some embodiments, a supervised learning technique is used for training a question answering network. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

At operation 700, the system receives a training set including a set of training phrases, where each of the training phrases includes a natural language query combined with a ground truth answer. In some examples, the training set may include questions combine with correct answers as well as incorrect answers. Annotation data may indicate whether the answer is correct or incorrect, so that both positive and negative examples may be used for training. In some cases, the operations of this step refer to, or may be performed by, a question answering network as described with reference to FIGS. 1, 3, and 4.

At operation 705, the system generates a set of meta-evidence nodes based on at least some of the training phrases (e.g., using a variant of a neural Turing machine) as described with reference to FIG. 3. In some cases, the operations of this step refer to, or may be performed by, a question answering network as described with reference to FIGS. 1, 3, and 4.

At operation 710, the system generates an input phrase for at least one of the training phrases by combining the natural language query with a set of candidate answers. In some cases, the operations of this step refer to, or may be performed by, a question answering network as described with reference to FIGS. 1, 3, and 4.

At operation 715, the system generates a support vector for the input phrase using a memory controller, where the support vector includes a weighted sum of the meta-evidence nodes. In some cases, the operations of this step refer to, or may be performed by, a question answering network as described with reference to FIGS. 1, 3, and 4.

At operation 720, the system selects a predicted answer to the natural language query from the candidate answers based on the support vector. In some cases, the operations of this step refer to, or may be performed by, a question answering network as described with reference to FIGS. 1, 3, and 4.

At operation 725, the system computes a loss function by comparing the predicted answer to ground truth answer. In some cases, the operations of this step refer to, or may be performed by, a question answering network as described with reference to FIGS. 1, 3, and 4.

At operation 730, the system updates parameters of the neural Turing machine and the memory controller based on the loss function. In some cases, the operations of this step refer to, or may be performed by, a question answering network as described with reference to FIGS. 1, 3, and 4.

As described herein, during a training process, node weights are adjusted to improve the accuracy of the result of a model, for example, by minimizing a loss function which corresponds in some way to the difference between the current result and the target result. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are mode during the next iteration.

EXAMPLE EMBODIMENTS

Accordingly, the present disclosure includes at least the following embodiments.

A method for neural network for question answering is described. Embodiments of the method are configured to identify a plurality of input phrases corresponding to a natural language query, wherein each of the input phrases comprises the natural language query and a candidate answer from a set of candidate answers, generate a support vector for each of the input phrases, wherein the support vector comprises a weighted sum of a plurality of meta-evidence nodes in an embedding space, and wherein the meta-evidence nodes summarize a set of training data, and select an answer to the natural language query from the set of candidate answers based on the support vector for each of the input phrases.

An apparatus for neural network for question answering is described. The apparatus includes a processor, memory in electronic communication with the processor, and instructions stored in the memory. The instructions are operable to cause the processor to identify a plurality of input phrases corresponding to a natural language query, wherein each of the input phrases comprises the natural language query and a candidate answer from a set of candidate answers, generate a support vector for each of the input phrases, wherein the support vector comprises a weighted sum of a plurality of meta-evidence nodes in an embedding space, and wherein the meta-evidence nodes summarize a set of training data, and select an answer to the natural language query from the set of candidate answers based on the support vector for each of the input phrases.

A non-transitory computer readable medium storing code for neural network for question answering is described. In some examples, the code comprises instructions executable by a processor to: identify a plurality of input phrases corresponding to a natural language query, wherein each of the input phrases comprises the natural language query and a candidate answer from a set of candidate answers, generate a support vector for each of the input phrases, wherein the support vector comprises a weighted sum of a plurality of meta-evidence nodes in an embedding space, and wherein the meta-evidence nodes summarize a set of training data, and select an answer to the natural language query from the set of candidate answers based on the support vector for each of the input phrases.

A system for neural network for question answering is described. Embodiments of the system are configured to identify a plurality of input phrases corresponding to a natural language query, wherein each of the input phrases comprises the natural language query and a candidate answer from a set of candidate answers, generate a support vector for each of the input phrases, wherein the support vector comprises a weighted sum of a plurality of meta-evidence nodes in an embedding space, and wherein the meta-evidence nodes summarize a set of training data, and select an answer to the natural language query from the set of candidate answers based on the support vector for each of the input phrases.

Some examples of the method, apparatus, non-transitory computer readable medium, and system described above further include receiving the natural language query from a user. Some examples further include concatenating the natural language query with each of the candidate answers to form the input phrases. In some examples, the natural language query is received from the user during an automated dialogue with the user in a chat application.

Some examples of the method, apparatus, non-transitory computer readable medium, and system described above further include embedding the input phrases into the embedding space using an embedding model. Some examples of the method, apparatus, non-transitory computer readable medium, and system described above further include generating a response to the natural language query based on the selected answer.

Some examples of the method, apparatus, non-transitory computer readable medium, and system described above further include generating weights of the support vector for each of the meta-evidence nodes using a neural network. Some examples of the method, apparatus, non-transitory computer readable medium, and system described above further include summarizing the training data using a neural Turing machine to produce the meta-evidence nodes. In some examples, each of the meta-evidence nodes represents a cluster of points from the training data in the embedding space.

Some examples of the method, apparatus, non-transitory computer readable medium, and system described above further include combining an input vector representing of each of the input phrases in the embedding space with the corresponding support vector to produce a combined vector. Some examples further include adding a bias vector to the combined vector to produce a biased combined vector. Some examples further include applying a softmax function to the biased combined vector to produce a probability value, wherein the answer is selected based on the probability value.

Some examples of the method, apparatus, non-transitory computer readable medium, and system described above further include updating the meta-evidence nodes based on the selected answer. Some examples of the method, apparatus, non-transitory computer readable medium, and system described above further include determining that the selected answer is incorrect. Some examples further include selecting one or more meta-evidence nodes that contributed to selecting the answer. Some examples further include identifying a data point in the set of training data that contributed to selecting the answer.

Some examples of the method, apparatus, non-transitory computer readable medium, and system described above further include removing the data point from the set of training data. Some examples further include updating the meta-evidence nodes after removing the data point. In some examples, a number of the meta-evidence nodes is greater than a number of the candidate answers.

An apparatus for neural network for question answering is described. Embodiments of the apparatus include an embedding network configured to embed input phrases corresponding to a natural language query into an embedding space, wherein each of the input phrases comprises the natural language query and a candidate answer from a set of candidate answers, a memory controller configured to generate a support vector for the input phrases, wherein the support vector comprises a weighted sum of a plurality of meta-evidence nodes in the embedding space, and wherein the meta-evidence nodes summarize a set of training data, and an answer selection module configured to select an answer to the natural language query from the set of candidate answers based on the support vector for each of the input phrases.

An system for neural network for question answering, comprising: an embedding network configured to embed input phrases corresponding to a natural language query into an embedding space, wherein each of the input phrases comprises the natural language query and a candidate answer from a set of candidate answers, a memory controller configured to generate a support vector for the input phrases, wherein the support vector comprises a weighted sum of a plurality of meta-evidence nodes in the embedding space, and wherein the meta-evidence nodes summarize a set of training data, and an answer selection module configured to select an answer to the natural language query from the set of candidate answers based on the support vector for each of the input phrases.

A method of providing an apparatus for neural network for question answering is described. The method includes providing an embedding network configured to embed input phrases corresponding to a natural language query into an embedding space, wherein each of the input phrases comprises the natural language query and a candidate answer from a set of candidate answers, providing a memory controller configured to generate a support vector for the input phrases, wherein the support vector comprises a weighted sum of a plurality of meta-evidence nodes in the embedding space, and wherein the meta-evidence nodes summarize a set of training data, and providing an answer selection module configured to select an answer to the natural language query from the set of candidate answers based on the support vector for each of the input phrases.

A method of using an apparatus for neural network for question answering is described. The method includes using an embedding network configured to embed input phrases corresponding to a natural language query into an embedding space, wherein each of the input phrases comprises the natural language query and a candidate answer from a set of candidate answers, using a memory controller configured to generate a support vector for the input phrases, wherein the support vector comprises a weighted sum of a plurality of meta-evidence nodes in the embedding space, and wherein the meta-evidence nodes summarize a set of training data, and using an answer selection module configured to select an answer to the natural language query from the set of candidate answers based on the support vector for each of the input phrases.

Some examples of the apparatus, system, and method described above further include a neural Turing machine configured to select the meta-evidence nodes based on the set of training data. In some examples, the neural Turing machine is trained together with the memory controller. Some examples of the apparatus, system, and method described above further include a dialog generator configured to generate a response to the natural language query based on the selected answer.

A method for training a neural network for question answering is described. Embodiments of the method are configured to receive a training set comprising a plurality of training phrases, wherein each of the training phrases comprises a natural language query combined with a ground truth answer, generate a plurality of meta-evidence nodes based on at least some of the training phrases using a neural Turing machine, generate an input phrase for at least one of the training phrases by combining the natural language query with a plurality of candidate answers, generate a support vector for the input phrase using a memory controller, wherein the support vector comprises a weighted sum of the meta-evidence nodes, select a predicted answer to the natural language query from the candidate answers based on the support vector, compute a loss function by comparing the predicted answer to ground truth answer, and update parameters of the neural Turing machine and the memory controller based on the loss function.

An apparatus for training a neural network for question answering is described. The apparatus includes a processor, memory in electronic communication with the processor, and instructions stored in the memory. The instructions are operable to cause the processor to receive a training set comprising a plurality of training phrases, wherein each of the training phrases comprises a natural language query combined with a ground truth answer, generate a plurality of meta-evidence nodes based on at least some of the training phrases using a neural Turing machine, generate an input phrase for at least one of the training phrases by combining the natural language query with a plurality of candidate answers, generate a support vector for the input phrase using a memory controller, wherein the support vector comprises a weighted sum of the meta-evidence nodes, select a predicted answer to the natural language query from the candidate answers based on the support vector, compute a loss function by comparing the predicted answer to ground truth answer, and update parameters of the neural Turing machine and the memory controller based on the loss function.

A non-transitory computer readable medium storing code for training a neural network for question answering is described. In some examples, the code comprises instructions executable by a processor to: receive a training set comprising a plurality of training phrases, wherein each of the training phrases comprises a natural language query combined with a ground truth answer, generate a plurality of meta-evidence nodes based on at least some of the training phrases using a neural Turing machine, generate an input phrase for at least one of the training phrases by combining the natural language query with a plurality of candidate answers, generate a support vector for the input phrase using a memory controller, wherein the support vector comprises a weighted sum of the meta-evidence nodes, select a predicted answer to the natural language query from the candidate answers based on the support vector, compute a loss function by comparing the predicted answer to ground truth answer, and update parameters of the neural Turing machine and the memory controller based on the loss function.

A system for training a neural network for question answering is described. Embodiments of the system are configured to receive a training set comprising a plurality of training phrases, wherein each of the training phrases comprises a natural language query combined with a ground truth answer, generate a plurality of meta-evidence nodes based on at least some of the training phrases using a neural Turing machine, generate an input phrase for at least one of the training phrases by combining the natural language query with a plurality of candidate answers, generate a support vector for the input phrase using a memory controller, wherein the support vector comprises a weighted sum of the meta-evidence nodes, select a predicted answer to the natural language query from the candidate answers based on the support vector, compute a loss function by comparing the predicted answer to ground truth answer, and update parameters of the neural Turing machine and the memory controller based on the loss function.

Some examples of the method, apparatus, non-transitory computer readable medium, and system described above further include embedding the training phrases and the input phrase into an embedding space using a pre-trained embedding network. Some examples of the method, apparatus, non-transitory computer readable medium, and system described above further include iteratively updating the parameters of the neural Turing machine and the memory controller to train the neural Turing machine and the memory controller.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
embedding an input phrase comprising a natural language query and a candidate answer from a set of candidate answers into an embedding space to obtain an embedded input phrase;
identifying a plurality of meta-evidence nodes in the embedding space based on the embedded input phrase, wherein each of the plurality of meta-evidence nodes represents a cluster of points in the embedding space, and wherein each point in the cluster of points is an embedding of a training example that includes a training query and a ground truth answer;
generating a support vector for the input phrase, wherein the support vector comprises a weighted sum of the plurality of meta-evidence nodes in the embedding space; and
selecting an answer to the natural language query from the set of candidate answers based on the support vector.

2. The method of claim 1, further comprising:
receiving the natural language query from a user; and
concatenating the natural language query with the candidate answer to form the input phrase.

3. The method of claim 1, wherein:
the natural language query is received from a user during an automated dialogue with the user in a chat application.

4. The method of claim 1, further comprising:
embedding the input phrase into the embedding space using an embedding model.

5. The method of claim 1, further comprising:
generating a response to the natural language query based on the selected answer.

6. The method of claim 1, further comprising:
generating weights of the support vector for each of the plurality of meta-evidence nodes using a neural network.

7. The method of claim 1, further comprising:
summarizing training data using a neural Turing machine to produce the plurality of meta-evidence nodes.

8. The method of claim 1, further comprising:
combining an input vector representing of the input phrase in the embedding space with a corresponding support vector to produce a combined vector;
adding a bias vector to the combined vector to produce a biased combined vector; and
applying a softmax function to the biased combined vector to produce a probability value, wherein the answer is selected based on the probability value.

9. The method of claim 1, further comprising:
updating the plurality of meta-evidence nodes based on the selected answer.

10. The method of claim 1, further comprising:
determining that the selected answer is incorrect;
selecting one or more meta-evidence nodes that contributed to selecting the answer; and
identifying a data point in a set of training data that contributed to selecting the answer.

11. The method of claim 10, further comprising:
removing the data point from the set of training data; and
updating the plurality of meta-evidence nodes after removing the data point.

12. The method of claim 1, wherein:
a number of the plurality of meta-evidence nodes is greater than a number of the set of candidate answers.

13. An apparatus comprising:
an embedding network configured to embed an input phrase comprising a natural language query and a candidate answer from a set of candidate answers into an embedding space to obtain an embedded input phrase;
a memory controller configured to identify a plurality of meta-evidence nodes in the embedding space based on the embedded input phrase and to generate a support vector for the input phrase, wherein each of the plurality of meta-evidence nodes represents a cluster of points in the embedding space, wherein each point in the cluster of points is an embedding of a training example that includes a training query and a ground truth answer, and wherein the support vector comprises a weighted sum of the plurality of meta-evidence nodes in the embedding space; and
an answer selection module configured to select an answer to the natural language query from the set of candidate answers based on the support vector for the input phrase.

14. The apparatus of claim 13, further comprising:
a neural Turing machine configured to select the plurality of meta-evidence nodes based on a set of training data.

15. The apparatus of claim 13, wherein:
a neural Turing machine is trained together with the memory controller.

16. The apparatus of claim 13, further comprising:
a dialog generator configured to generate a response to the natural language query based on the selected answer.

17. A method of training a neural network for question answering, the method comprising:
receiving a training set comprising a plurality of training phrases, wherein each of the plurality of training phrases comprises a natural language query combined with a ground truth answer;
generating an input phrase for at least one of the plurality of training phrases by combining the natural language query with a plurality of candidate answers;
embedding the input phrase into an embedding space to obtain an embedded input phrase;
identifying a plurality of meta-evidence nodes in the embedding space based on the embedded input phrase, wherein each of the plurality of meta-evidence nodes represents a cluster of points in the embedding space, and wherein each point in the cluster of points is an embedding of a training phrase of the plurality of training phrases;
generating a support vector for the input phrase using a memory controller, wherein the support vector comprises a weighted sum of the plurality of meta-evidence nodes in the embedding space;
selecting a predicted answer to the natural language query from the plurality of candidate answers based on the support vector;
computing a loss function by comparing the predicted answer to the ground truth answer; and
updating parameters of a neural Turing machine and the memory controller based on the loss function.

18. The method of claim 17, further comprising:
embedding the plurality of training phrases and the input phrase into the embedding space using a pre-trained embedding network.

19. The method of claim 17, further comprising:
iteratively updating the parameters of the neural Turing machine and the memory controller to train the neural Turing machine and the memory controller.

* * * * *